United States Patent
Tabata

(10) Patent No.: US 12,146,084 B2
(45) Date of Patent: Nov. 19, 2024

(54) ADHESIVE SHEET, LAMINATED SHEET, AND IMAGE DISPLAY DEVICE USING SAME

(71) Applicant: Mitsubishi Chemical Corporation, Chiyoda-ku (JP)

(72) Inventor: Daiki Tabata, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 1088 days.

(21) Appl. No.: 17/042,645

(22) PCT Filed: Mar. 27, 2019

(86) PCT No.: PCT/JP2019/013268
§ 371 (c)(1),
(2) Date: Sep. 28, 2020

(87) PCT Pub. No.: WO2019/189404
PCT Pub. Date: Oct. 3, 2019

(65) Prior Publication Data
US 2021/0032504 A1    Feb. 4, 2021

(30) Foreign Application Priority Data

Mar. 29, 2018 (JP) ................ 2018-065897

(51) Int. Cl.
*C09J 7/10*     (2018.01)
*C09J 5/00*     (2006.01)
*C09J 7/38*     (2018.01)
*G02F 1/1333*   (2006.01)

(52) U.S. Cl.
CPC ............ *C09J 7/381* (2018.01); *C09J 5/00* (2013.01); *C09J 7/10* (2018.01); *C09J 2203/326* (2013.01); *C09J 2301/302* (2020.08); *C09J 2423/00* (2013.01); *C09J 2475/00* (2013.01); *G02F 1/13338* (2013.01); *G02F 2202/28* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,237,027 A * | 8/1993 | Kawame | C09J 123/22 526/272 |
| 8,815,406 B2 | 8/2014 | Fujii et al. | |
| 10,752,810 B2 | 8/2020 | Erdogau-Haug et al. | |
| 2007/0166510 A1 | 7/2007 | Kato et al. | |
| 2007/0254136 A1 | 11/2007 | Kato et al. | |
| 2013/0095339 A1 | 4/2013 | Fujii et al. | |
| 2015/0030836 A1 | 1/2015 | Ooga et al. | |
| 2015/0079379 A1 | 3/2015 | Suzuki et al. | |
| 2015/0166860 A1 * | 6/2015 | Yuan | B32B 37/1284 522/18 |
| 2016/0122599 A1 | 5/2016 | Kim et al. | |
| 2016/0215178 A1 | 7/2016 | Inenaga et al. | |
| 2017/0147098 A1 | 5/2017 | Fukatani | |
| 2017/0365804 A1 | 12/2017 | Johnson et al. | |
| 2018/0291238 A1 | 10/2018 | Erdogan-Haug et al. | |
| 2018/0354229 A1 | 12/2018 | Onishi et al. | |
| 2020/0224061 A1 | 7/2020 | Oh et al. | |
| 2020/0347271 A1 | 11/2020 | Erdogau-Haug et al. | |
| 2023/0295476 A1 * | 9/2023 | Asano | C09J 133/08 525/185 |

FOREIGN PATENT DOCUMENTS

| | | |
|---|---|---|
| CN | 104169317 A | 11/2014 |
| CN | 104364282 A | 2/2015 |
| CN | 105705605 A | 6/2016 |
| CN | 107683313 A | 2/2018 |
| JP | 2005-239956 A | 9/2005 |
| JP | 2010-72471 A | 4/2010 |

(Continued)

OTHER PUBLICATIONS

Isobutylene compound summary, PubChem, National Library of Medicine, retrived on Apr. 1, 2024 (Year: 2024).*
Combined Chinese Office Action and Search Report issued Dec. 7, 2021 in Chinese Patent Application No. 201980023111.5 (with English translation), 25 pages.
Combined Taiwanese Office Action and Search Report issued on Apr. 8, 2022 in Taiwanese Patent Application No. 108111216 (with English translation), 23 pages.
International Search Report issued on Jul. 2, 2019 in PCT/JP2019/013268 filed on Mar. 27, 2019, 2 pages.
Third Party Submission issued Mar. 28, 2022 in Japanese Patent Application No. 2019-60576 (with English language translation), 12 pages.

(Continued)

*Primary Examiner* — Anish P Desai
(74) *Attorney, Agent, or Firm* — Oblon, McClelland, Maier & Neustadt, L.L.P.

(57) ABSTRACT

An adhesive sheet and a laminated sheet wherein stress applied to a member sheet is reduced in the laminated sheet formed by laminating the member sheet and the adhesive sheet, and the adhesive sheet and the laminated sheet do not break or delaminate even though a folding operation is conducted under low temperature and high temperature conditions are provided, and an adhesive sheet wherein the restorability when the folded adhesive sheet is opened is good is further provided. An adhesive sheet satisfying the following requirements (1) to (2) is proposed.

(1) A storage shear modulus at 80° C. (G' (80° C.)) obtained by dynamic viscoelasticity measurement in shearing mode at a frequency of 1 Hz is 1 kPa or more and less than 20 kPa, and a loss tangent at 80° C. (tan δ (80° C.)) is less than 0.50.

(2) A storage shear modulus at −20° C. (G' (−20° C.)) obtained by dynamic viscoelasticity measurement in shearing mode at a frequency of 1 Hz is 1 kPa or more and less than 1000 kPa.

18 Claims, No Drawings

(56) References Cited

FOREIGN PATENT DOCUMENTS

| | | |
|---|---|---|
| JP | 2012-184390 A | 9/2012 |
| JP | 2014-152198 | 8/2014 |
| JP | 2014-231574 A | 12/2014 |
| JP | WO 2015/152334 A1 | 10/2015 |
| JP | 2017-95655 A | 6/2017 |
| JP | 2017-119801 A | 7/2017 |
| JP | 2017119801 A2 † | 7/2017 |
| JP | 2017-226785 A | 12/2017 |
| JP | 2018-168305 A | 11/2018 |
| KR | 20150106770 A † | 9/2015 |
| KR | 10-2017-0062373 A | 6/2017 |
| KR | 10-2018-0057708 A | 5/2018 |
| KR | 10-2020-0088536 A | 7/2020 |
| TW | 201726398 A | 8/2017 |
| WO | WO 03/093336 A1 | 11/2003 |
| WO | WO 2005/083023 A1 | 9/2005 |
| WO | WO 2011/162125 A1 | 12/2011 |
| WO | WO 2016/196458 A2 | 12/2016 |
| WO | WO 2018/174085 A | 9/2018 |

OTHER PUBLICATIONS

Korean Office Action issued Jan. 11, 2023 in Korean Application No. 10-2020-7030879 (with English Translation), 10 pages.

\* cited by examiner
† cited by third party

ADHESIVE SHEET, LAMINATED SHEET, AND IMAGE DISPLAY DEVICE USING SAME

TECHNICAL FIELD

The present invention relates to an adhesive sheet, a laminated sheet and a flexible image display device using the same.

BACKGROUND ART

Image display devices comprising curved surfaces and foldable image display devices using organic light emitting diodes (OLEDs) or quantum dots (QD) have been developed and have been commercialized widely in recent years.

Such display devices have laminated structures in which a plurality of member sheet members such as a cover lens, a circularly polarizing plate, a touch film sensor and a light emitting element are pasted with transparent adhesive sheets. When adhesive sheets are brought into focus, the display devices can be regarded as laminated sheets in which first member sheets and adhesive sheets are laminated.

Foldable image display devices cause various problems due to stress between layers at the time of folding. For example, layers may peel at the time of folding, and a laminated sheet which does not peel even though the laminated sheet is folded has been desired. A laminated body which is rapidly restored to the flat state when the folded screen is opened has been desired. While the folding operation is repeated, a member sheet which is an adherend may crack and fracture finally. A laminated sheet which is durable especially in repeated folding operation at low temperature has been desired.

Patent Literature 1 discloses an optical device member for flexible displays, comprising: a first adhesive film; a touch functional member; and a second adhesion film, wherein the storage shear modulus at 80° C. of the first adhesion film or the second adhesion film is 10 kPa to 1000 kPa, and the average gradient of the storage shear modulus from −20° C. to 80° C. is −9.9 to 0, and shows a suitable viscoelasticity range.

CITATION LIST

Patent Literature

Patent Literature 1: US 2016/0122599A1

SUMMARY OF INVENTION

Technical Problem

However, even though the viscoelasticity of the adhesive sheet is in the above-mentioned range disclosed in the Patent Literature 1, the viscoelasticity is often not enough to suppress trouble, the amount of distortion of the adhesive sheet increases depending on the laminated configuration and the radius of curvature at the time of folding, and trouble such as a phenomenon in which layers exfoliate after adhesion (delamination) may occur.

Adherends have increasingly been thinner in recent years, and have problems such as cracking adherends by stress between layers due to folding. Especially when a folding operation is performed at low temperature, this problem easily occurs due to increase in the storage modulus of an adhesive sheet. For example, even though the storage modulus at 80° C. is 10 kPa based on Patent Literature 1, the storage modulus at −20° C. is as high as around 10 MPa when the gradient of the storage modulus from −20° C. to 80° C. is −9.9. When a folding operation is repeated at −20° C., a member sheet may break.

Therefore, the present invention provides an adhesive sheet and a laminated sheet wherein stress applied to a member sheet is reduced in the laminated sheet formed by laminating the member sheet and the adhesive sheet, and the adhesive sheet and the laminated sheet do not break or delaminate even though a folding operation is conducted under low temperature and high temperature conditions, and further provides an adhesive sheet and a laminated sheet wherein the restorability when the folded laminated sheet is opened is good.

Solution to Problem

The present invention proposes an adhesive sheet, satisfying the following requirements (1) to (2).
(1) A storage shear modulus at 80° C. (G' (80° C.)) obtained by dynamic viscoelasticity measurement in shearing mode at a frequency of 1 Hz is 1 kPa or more and less than 20 kPa, and a loss tangent at 80° C. (tan δ (80° C.)) is less than 0.50.
(2) A storage shear modulus at −20° C. (G' (−20° C.)) obtained by dynamic viscoelasticity measurement in shearing mode at a frequency of 1 Hz is 1 kPa or more and less than 1000 kPa.

The present invention also proposes a laminated sheet, comprising: a configuration formed by laminating a first member sheet and an adhesive sheet, wherein the laminated sheet satisfies the following requirements (1) to (3).
(1) The adhesive sheet has a storage shear modulus at 80° C. (G' (80° C.)) of 1 kPa or more and less than 20 kPa obtained by dynamic viscoelasticity measurement in shearing mode at a frequency of 1 Hz and a loss tangent at 80° C. (tan δ (80° C.)) of less than 0.50.
(2) The adhesive sheet has a storage shear modulus at −20° C. (G' (−20° C.)) of 1 kPa or more and less than 1000 kPa obtained by dynamic viscoelasticity measurement in shearing mode at a frequency of 1 Hz.
(3) The first member sheet has a tensile strength at 25° C. of 10 MPa to 900 MPa measured according to ASTM D882.

Advantageous Effects of Invention

In an adhesive sheet which the present invention proposes, reducing the storage modulus of the adhesive sheet, preferably reducing the storage modulus to less than the lower limit value specified in Patent Literature 1, and adjusting the loss tangent to a predetermined range enables preventing delamination and breakage due to a folding operation when an adhesive sheet is stuck to a adherend, and renders the restorability good.

A laminated sheet which the present invention proposes is a laminated sheet formed by laminating a first member sheet and an adhesive sheet so that reducing the storage modulus of the adhesive sheet, preferably reducing the storage modulus to less than the lower limit value specified in Patent Literature 1, and adjusting the tensile strength of the member sheet to a predetermined range enables reducing stress applied to the first member sheet and preventing the laminated body from delaminating and breaking even though a folding operation is conducted under low temperature and high temperature conditions. Additionally adjusting the loss tangent of the adhesive sheet to a predetermined range renders the restorability good.

Therefore, the adhesive sheet and the laminated body which the present invention proposes can be suitably used as constituent members of flexible image display devices and the like.

DESCRIPTION OF EMBODIMENTS

Next, the present invention will be described based on examples of embodiments. However, the present invention is not limited to the embodiments described hereinafter.

[The Present Laminated Body]

A laminated sheet according to one example of an embodiment of the present invention (hereinafter occasionally called "the present laminated sheet") is a laminated sheet formed by laminating a first member sheet and an adhesive sheet. As mentioned below, the present laminated sheet may be a laminated sheet comprising a configuration formed by laminating a first member sheet, an adhesive sheet, and a second member sheet in this order.

<Thickness of Present Laminated Sheet>

Although the thickness of the present laminated sheet is not particularly limited, as an example when the laminated sheet is used for an image display device, the formed body is sheet-shaped. If the thickness thereof is 0.01 mm or more, the handleability is good. If the thickness is 1 mm or less, the thickness can contribute to the slimming down of the laminated body.

Therefore, the thickness of the present laminated sheet is preferably 0.01 mm or more, especially more preferably 0.03 mm or more, and particularly more preferably 0.05 mm or more. Meanwhile, the upper limit is preferably 1 mm or less, especially further preferably 0.7 mm or less, and particularly further preferably 0.5 mm or less.

The present adhesive sheet and the member sheet which constitute the present laminated sheet will be described hereinafter.

[Present Adhesive Sheet]

<Storage Shear Modulus and Loss Tangent>

The adhesive sheet used for the present laminated sheet (called "the present adhesive sheet") preferably has a storage shear modulus at 80° C. (G' (80° C.)) of 1 kPa or more and less than 20 kPa obtained by dynamic viscoelasticity measurement in shearing mode at a frequency of 1 Hz and a loss tangent at 80° C. (tan δ (80° C.)) of less than 0.50.

The storage shear modulus at 80° C. (G' (80° C.)) of the present adhesive sheet is preferably 1 kPa or more and 20 kPa or less, and especially further preferably 2 kPa or more or less than 10 kPa. Adjusting the (G' (80° C.)) to the above-mentioned range enables reducing stress between layers at the time of folding at any temperature from normal to high temperature and suppressing the delamination and the breakage of the member sheet.

The loss tangent at 80° C. (tan δ (80° C.)) of the present adhesive sheet in shear measurement at a frequency of 1 Hz is preferably less than 0.50, more preferably less than 0.3, especially further preferably less than 0.30, further preferably less than 0.28, and particularly preferably less than 0.26. Adjusting the tan δ (80° C.) to the above-mentioned range enables suppressing the flow and also rendering the restorability when the folded laminated body is opened good.

The molecular weight between crosslinking points may be increased, and the gel component may be rendered large to reduce both (G' (80° C.)) and loss tangent (tan δ (80° C.)) as described above. The molecular weight between crosslinking points can be adjusted by a technique such as reducing polyfunctional monomers or using a crosslinking agent having a high molecular weight to increase the molecular weight between crosslinking points in the adhesive sheet.

Additionally, a technique for reducing uncrosslinked or unreacted components in the present adhesive sheet can be used to reduce the loss tangent (tan δ (80° C.)).

Even though the (G' (80° C.)) of the present adhesive sheet is 20 kPa or less, the present adhesive sheet flows when the loss tangent (tan δ (80° C.)) is large. However, adjusting the loss tangent (tan δ (80° C.)) to less than 0.50, preferably less than 0.3 enables suppressing the flow and also rendering the restorability when the folded laminated body is opened good.

The storage shear modulus at −20° C. (G' (−20° C.)) of the present adhesive sheet obtained by dynamic viscoelasticity measurement in shearing mode at a frequency of 1 Hz is preferably 1 kPa or more and less than 1000 kPa, especially further preferably 10 kPa or more or less than 1000 kPa. Adjusting the (G' (−20° C.)) of the adhesive sheet to less than 1000 kPa enables reducing stress between layers at the time of folding at low temperature and suppressing the delamination and the breakage of the member sheet.

Since an adhesive sheet generally has a glass transition temperature (Tg) at low temperature to normal temperature, (G' (−20° C.)) is larger than (G' (80° C.)). However, even though a folding operation is conducted at low temperature, the breakage of the member sheet can be prevented when the (G' (−20° C.)) is less than 1000 kPa. The thickness of a member sheet has increasingly been thinner in recent years. If the (G' (−20° C.)) is less than 1000 kPa, stress to the member sheet can be reduced.

Meanwhile, as mentioned above, the loss tangent at 80° C. (tan δ (80° C.)) is preferably adjusted to less than 0.50 to render the restorability when the present folded laminated body is opened good.

The Tg of the adhesive sheet needs to be lowered to adjust the (G' (−20° C.)) to less than 1000 kPa as mentioned above. However, since it is difficult to develop the flatness of the plateau region in the storage modulus only by copolymerizing monofunctional monomers such as 2EHA (2-ethylhexyl acrylate) and 4HBA (4-hydroxybutyl acrylate) having low Tg like Patent Literature 1, it is difficult to adjust the tan δ (80° C.) to the above-mentioned range. Therefore, it is difficult to obtain an adhesive sheet having good restorability. This is clear also from the fact that the recovery rate in Comparative Examples of Patent Literature 1 is small.

Then, although organic particles in which the refractive index was adjusted to that of a matrix resin were added to compensate the restorability in Patent Literature 1, it was confirmed that the method for adding these organic particles had a defect. It is a fact that although the haze of an acrylic-based adhesive sheet used for optical uses is usually 0.2 to 0.3, an acrylic-based adhesive sheet to which organic particles are added has a comparatively high haze even though the refractive indices are adjusted. It is found that there is the defect of the haze being further high especially at high temperature and high humidity, and it is considered that this is because the matrix resin absorbed moisture easily, the refractive index of the matrix resin also changed easily, but the organic particles were unlikely to absorb moisture, the refractive index of the organic particles was unlikely to change, and therefore the refractive-index difference was made.

Examples of the member sheet used for image display devices include polyimides, polyesters, TAC and cyclic olefins. The tensile strength at 25° C. of cyclic olefin polymers was as low as 40 to 60 MPa at 100 μm. In the case of a laminated body using such a member sheet having a lower tensile strength, the laminated body easily broke at the time of folding, it is difficult to solve the breakage by conventional technology. Therefore, it can be deemed conversely that the effect of the present invention can be further enjoyed.

Reducing stress between layers which occurs at the time of folding enables folding the present laminated body without breaking even though a member sheet having a lower tensile strength is used.

Various methods are considered as methods for reducing stress between layers. Among them, stress between layers in the present laminated body is reduced since an adhesive sheet having a lower plateau modulus than an optical adhesive sheet usually used by one or more figures dares to be used. That is, the Tg of an adhesive sheet is usually normal temperature or less, and an adhesive sheet has a crosslinked structure, 80° C. is therefore in the rubbery plateau region, and the storage modulus at 80° C. of an adhesive sheet (G' (80° C.)) shows a value close to the plateau modulus. Meanwhile, the storage modulus (G' (80° C.)) of the present adhesive sheet is 20 kPa or less, and preferable 10 kPa or less.

Stress between layers at the time of folding can be originally found by the product of the "elastic modulus determined from the speed (frequency) and the temperature at the time of folding" and the "distortion", and when a plateau modulus is reduced, stress between layers can therefore be reduced in a wide temperature region.

The flow of the adhesive sheet itself and a decrease in peel strength were feared, and adhesive sheets having a plateau modulus (G' (80° C.)) of 20 kPa or less was hardly used for image display devices conventionally. However, it was found that if the adhesive sheet was an adhesive sheet satisfying a relationship in which the tan δ (80° C.) was less than 0.50, and preferably less than 0.3, such a problem was unlikely to occur.

Even though the plateau modulus is 20 kPa or less, the elastic modulus at low temperature increases, and a member sheet may break due to a folding operation at low temperature when the Tg is not enough low. It has also been found as one standard that if the storage modulus at −20° C. (G' (−20° C.)) is less than 1000 kPa, the breakage of a member sheet can be suppressed.

In conventional technology, the restorability was evaluated with the evaluation specializing in to what degree the distortion recovers, and the restoration speed has hardly been discussed. Meanwhile, the present laminated body is characterized in that the present laminated body is restored rapidly when the folded laminated body is opened, and can meet potential needs when a foldable image display device is used.

As mentioned above, it can be considered that in the present laminated body, reducing stress between layers which occurs at the time of folding by daring to using an adhesive sheet using a material having a lower plateau modulus than an optical adhesive sheet usually used by one or more figures enables folding the present laminated body without breaking even though a member sheet having a lower tensile strength is used, and if an adhesive sheet having such a property, the same effect can be enjoyed regardless of the type of the material.

[Maximum Point of Loss Tangent (Tan δ) and Glass Transition Temperature (Tg)]

The maximum point of the loss tangent of the present adhesive sheet obtained by dynamic viscoelasticity measurement in shearing mode at a frequency of 1 Hz is preferably −15° C. or less.

The maximum point of the loss tangent (tan δ) can be interpreted as the glass transition temperature (Tg), and when the Tg is in the above-mentioned range, the (G' (−20° C.)) of the present adhesive sheet is easily adjusted to less than 1000 kPa.

The "glass transition temperature" refers to the temperature at which a peak of the primary dispersion of the loss tangent (tan δ) appears. Therefore, when only one maximum point of the loss tangent (tan δ) obtained by dynamic viscoelasticity measurement in shearing mode at a frequency of 1 Hz is observed, in other words, when the tan δ curve exhibits a single peak mountain shape, the glass transition temperature (Tg) can be regarded as single.

The "maximum point" of the loss tangent (tan δ) means the point having the largest value in a prescribed range or the whole range among peak values in the tan δ curve, namely points of inflection at which the differentiated tan δ changes from positives (+) to negatives (−).

The elastic modulus (storage modulus) G', the viscosity coefficient (loss modulus) G", the tan δ=G"/G' at various temperatures can be measured using a strain rheometer.

<Relative Dielectric Constant>

The relative dielectric constant of the present adhesive sheet is preferably 3.0 or less.

If the relative dielectric constant of the present adhesive sheet is 3.0 or less, malfunctions and the like can be reduced when the present adhesive sheet is used, for example, for a member under a touch panel.

The present adhesive sheet preferably has a relative dielectric constant of 3.0 or less, especially preferably 2.0 or more or 3.0 or less, especially preferably 2.0 or more or 2.8 or less from such a viewpoint.

For example, using a polyolefin-based adhesive, a silicone-based adhesive, or the like enables adjusting the relative dielectric constant to the above-mentioned range as a method for adjusting the relative dielectric constant of the present adhesive sheet.

In an adhesive containing a butene-based polymer and an acrylic-based polymer mentioned below as an example of the present adhesive sheet, as the amount of the butene-based polymer is increased, the relative dielectric constant can be reduced.

<Total Light Transmittance and Haze>

The total light transmittance of the present adhesive sheet is preferably 85% or more, further preferably 88% or more, and further preferably 90% or more.

The present adhesive sheet has a haze of preferably 1.0% or less, further preferably 0.8% or less, and particularly more preferably 0.5% or less.

When the haze of the present adhesive sheet is 1.0% or less, the present adhesive sheet can be used for image display devices.

The present adhesive sheet does not preferably contain organic particles to adjust the haze of the present adhesive sheet to the above-mentioned range.

As to an adhesive containing the butene-based polymer and an acrylic-based polymer and mentioned below as an example of the present adhesive sheet, the type of the butene-based polymer may be adjusted, and adjusting the type and the amount of the acrylic-based polymer in comparison with the butene-based polymer enables adjusting the total light transmittance to the above-mentioned range or adjusting the haze to the above-mentioned range.

<Thickness of Present Adhesive Sheet>

The thickness of the present adhesive sheet is not particularly limited. If the thickness thereof is 0.01 mm or more, the handleability is good. If the thickness is 1 mm or less, the thickness can contribute to the slimming down of the laminated body.

Therefore, the thickness of the present adhesive sheet is preferably 0.01 mm or more, especially more preferably 0.03 mm or more, and particularly more preferably 0.05 mm or more. Meanwhile, the upper limit is preferably 1 mm or less, especially further preferably 0.7 mm or less, and particularly further preferably 0.5 mm or less.

<Material of Present Adhesive Sheet>

The material of the present adhesive sheet is not particularly limited as long as the present adhesive sheet satisfies the above-mentioned physical properties. Examples of the material especially include acrylic-based adhesives, polyolefin-based adhesives and silicone-based adhesives. An acrylic-based adhesive and a polyolefin-based adhesive are especially preferable, and the present adhesive sheet preferably contains a butene-based polymer and an acrylic-based polymer especially from the viewpoints of adhesion to a member sheet and restorability.

Next, as an example of the preferable present adhesive sheet, an example of the composition of the adhesive sheet containing a butene-based polymer and an acrylic-based polymer will be described.

When an adhesive containing a butene-based polymer and an acrylic-based polymer is used as the present adhesive sheet, it is preferable to adjust the types and the amounts of a butene-based polymer and an acrylic-based polymer respectively. It is also preferable to add a tackifier from the viewpoint of adjusting the viscoelasticity.

Then, the butene-based polymer, the acrylic-based polymer in combination with this, and further the tackifier will first be described sequentially.

(Butene-Based Polymer)

The butene-based polymer used for the present adhesive sheet preferably has an isobutene unit as a structure unit from the viewpoint of enhancing internal friction and moisture barrier properties. More specifically, the copolymer is preferably a copolymer having an isobutene unit represented by the following formula (1) at 5 to 100% by mass.

The content of the isobutene unit is especially further preferably 10% by mass or more or 100% by mass or less, and especially further preferably 50% by mass or more or 99% by mass or less.

Although preferable examples of a copolymer component of the isobutene unit include n-butene, isoprene, styrene and vinyl ether, especially a preferable copolymer component is n-butene.

The content when the butene-based polymer contains a n-butene unit is 0.1% by mass or more or 50% by mass or less, and especially further preferably 1% by mass or more or 40% by mass or less.

[Formula 1]

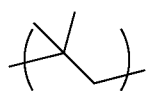

(1)

Examples of the butene-based polymer include copolymers obtained by brominating or chlorinating the above-mentioned copolymers. These polymers can be used alone or in combination of two or more.

Examples of the method for synthesizing a butene-based polymer include a method for polymerizing monomer components such as isobutene in the presence of a Lewis acid catalyst such as aluminium chloride or boron trifluoride.

When the present adhesive sheet contains a butene-based polymer having a number average molecular weight (Mn) of less than 5000, the steam barrier properties and the low dielectric constant properties can be maintained. However, the maintenance of the shape may be difficult when the number average molecular weight (Mn) is too low.

Therefore, the number average molecular weight (Mn) of the butene-based polymer is preferably less than 5000, especially further preferably 10 or more or 4000 or less, especially further preferably 100 or more or 3000 or less, and especially particularly further preferably 500 or more or 2000 or less.

Two or more butene-based polymers having different number average molecular weights (Mn) can also be used in combination.

For example, a butene-based polymer having a number average molecular weight (Mn) of less than 5000 and a butene-based polymer having a number average molecular weight (Mn) of 5000 or more may be used together in combination, and the number average molecular weight (Mn) as the whole butene-based polymer may be adjusted to the above-mentioned range.

(Acrylic-Based Polymer)

In the present adhesive sheet, the acrylic-based polymer combined with a butene-based polymer preferably has a monofunctional (meth)acrylate unit and a polyfunctional (meth)acrylate unit represented by the following formula (2) as structure units, respectively.

[Formula 2]

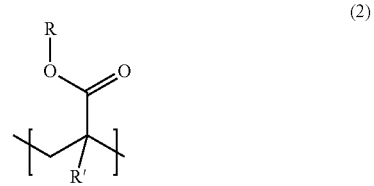

(2)

In the above-mentioned formula (2), R represents a long-chain alkyl group having 10 or more carbon atoms. In the above-mentioned formula, R' is preferably hydrogen (H) or a methyl group ($CH_3$).

The long-chain alkyl group having 10 or more carbon atoms (R) refers to, for example, an alkyl group wherein the main chain has 10 or more carbon atoms. Examples of the alkyl group include a decyl group ($C_{10}$), an undecyl group ($C_{11}$), a dodecyl group ($C_{12}$), a tridecyl group ($C_{13}$), a tetradecyl group ($C_{14}$), a pentadecyl group ($C_{15}$), a hexadecyl group ($C_{16}$), a heptadecyl group ($C_{17}$), an octadecyl group ($C_{18}$) and a nonadecyl group ($C_{19}$). The upper limit of the carbon number of the main chain is not particularly defined. However, if the upper limit is 20 or less, and preferably 18 or less, monofunctional aliphatic (meth)acrylates are unlikely to be crystallized. Therefore, the transparency due to a low haze and a high total light transmittance is easily exhibited.

If the carbon number of the main chain is 10 or more, the long-chain alkyl group (R) may have a branched alkyl group. Generally, a branched alkyl group is more unlikely to provide crystallization in the normal temperature region, and more easily provides the transparency than a linear alkyl group.

Using two or more (meth)acrylates having different long-chain alkyl groups together is also effective in suppressing crystallization and improving the transparency.

The Hansen solubility parameter (HSP) of the monofunctional (meth)acrylate has an HSP distance of preferably 5.0 or less, more preferably 4.5 or less, and further particularly preferably 3.8 or less from the butene-based polymer.

If the HSP distance between the butene-based polymer and the monofunctional acrylate of the acrylate-based polymer is 5.0 or less, the compatibility between the butene-based polymer and the acrylate-based polymer is good, and bleed-out and the deterioration of the transparency due to increase in the dispersion diameter can be suppressed.

Here, "Hansen's solubility parameters (HSPs)" are an index indicating a solubility, namely how much of a substance can be dissolved in another substance.

The HSPs are parameters obtained by dividing the solubility parameter introduced by Hildebrand into three components which are a dispersion term δD, a polarization term δP, and a hydrogen bond term δH and expressing the three components in three-dimensional space. The dispersion term δD indicates the effect of dispersion force, the polarization term δP indicates the effect of force between dipoles, and the hydrogen bond term δH indicates the effect of hydrogen bonding force.

δD: Energy derived from dispersion force between molecules

δP: Energy derived from polar force between molecules

δH: Energy derived from hydrogen bonding force between molecules

The three terms are written as mentioned above. Here the unit of each term is $MPa^{0.5}$.

The definition and the calculation of HSPs are described in the following literature.

Hansen Solubility Parameters: A Users Handbook, by Charles M. Hansen (CRC Press, LLC, 2007).

The dispersion term reflects the action of Van der Waals force, the polarization term reflects the action of the dipole moment, and the hydrogen bond term reflects the action of water, alcohol or the like. It can be determined that substances having similar vectors according to HSP have high solubility, and the degree of the similarity between the vectors can be determined by the distance between the Hansen solubility parameters (HSP distance). Hansen's solubility parameters can serve as indices for not only the determination of the solubility but also the determination of to what degree a substance easily exists in another substance, namely to what degree the dispersibility is good.

In the present invention, for example, using the computer software Hansen Solubility Parameters in Practice (HSPiP) enables estimating the HSPs [δD, δP, δH] from the chemical structures thereof conveniently. The HSPs are specifically found from the chemical structures by a Y-MB method implemented in HSPiP. When the chemical structures are unknown, the HSPs are also found from the results of the dissolution tests using a plurality of solvents by a sphere method implemented in HSPiP.

The HSP distance (Ra) can be calculated by the following expression, for example, when the HSPs of a solute (for example, the monofunctional (meth)acrylate) is ($δD_1$, $δP_1$, $δH_1$), and the HSPs of a solvent (for example, the butene-based polymer) is ($δD_2$, $δP_2$, $δH_2$).

HSP distance$(Ra)=\{4×(δD_1-δD_2)^2+(δP_1-δP_2)^2+(δH_1-δH_2)^2\}^{0.5}$

The monofunctional (meth)acrylate may be used alone or in combination of several.

The content of the monofunctional (meth)acrylate based on the whole acrylate-based polymer component is preferably 60 to 90% by mass, and especially more preferably 70% by mass or more or 90% by mass or less. The cohesive force can also be enhanced by adjusting the content to the above-mentioned range while the transparency is exhibited.

The content of the (meth)acrylate component is preferably 5% by mass or more, preferably 10% by mass or more, and more preferably 15% by mass or more. When the content is 5% by mass or more, the creep resistance of the present adhesive sheet can be enhanced. Meanwhile, the upper limit is preferably 40% by mass or less, preferably 38% by mass or less, and more preferably 35% by mass or less. When the content is 40% by mass or less, the steam barrier properties of the formed body can be enhanced.

The present adhesive sheet preferably contains a polyfunctional (meth)acrylate unit to exhibit the molecule chain network of the acrylate-based polymer and adjust the tan δ of the formed body.

The polyfunctional acrylate is a (meth)acrylate wherein the (meth)acrylate has two or more (meth)acryloyloxy groups, and at least (meth)acryloyloxy groups are bound through a hydrocarbon group. The following formula (3) represents the structure of a difunctional aliphatic (meth)acrylate as an example of a polyfunctional (meth)acrylate.

[Formula 3]

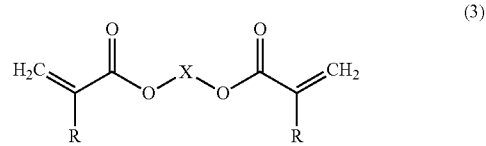

(3)

In the above-mentioned formula, R is hydrogen (H) or a methyl group ($CH_3$).

X is an aliphatic hydrocarbon group or an alicyclic hydrocarbon group.

The Hansen solubility parameters (HSPs) of the polyfunctional (meth)acrylate is at a location at which the HSP distance between the polyfunctional (meth)acrylate and the isobutylene polymer is preferably 9.0 or less, and more preferably 8.0 or less.

Trouble with transparency such as bleed-out and adhesiveness can be suppressed by adjusting the HSP distance to the above-mentioned range.

In the polyfunctional (meth)acrylate, the aliphatic hydrocarbon group or the alicyclic hydrocarbon group (X) is preferably a hydrocarbon group not containing a multiple bond from the viewpoint of the long-term stability of the present adhesive sheet.

Examples of the polyfunctional (meth)acrylate used for the present adhesive sheet include di(meth)acrylates such as 1,9-nonanediol di(meth)acrylate, 1,10-decanediol di(meth)acrylate, and hydrogenated polybutadiene (meth)acrylate which has a linear alkyl group; and di(meth)acrylates such as tricyclodecanediol di(meth)acrylate and tricyclodecanedimethanol di(meth)acrylate which has an alicyclic skeleton. However, the polyfunctional (meth)acrylate is not limited to these.

As the polyfunctional (meth)acrylate, a polyfunctional urethane acrylate can also be used, and the polyfunctional (meth)acrylate preferably contains the difunctional urethane acrylate. A urethane acrylate having an aliphatic polymer such as polybutadiene in the skeleton is preferable from the viewpoint of the compatibility with the butene-based polymer component.

Examples of a commercial item include brand name: CN9014 NS (Sartomer) and brand name: BAC-45 (manufactured by OSAKA ORGANIC CHEMICAL INDUSTRY LTD., polybutadiene terminal diacrylate).

The polyfunctional (meth)acrylate is not limited to difunctional (meth)acrylates, and a polyfunctional (meth)acrylate having 3, 4, or more than 4 (meth)acryloyl groups may be used. Especially, the polyfunctional (meth)acrylate is preferably a difunctional (meth)acrylate from the viewpoints of the long-term stability of an adhesive sheet and the ease of obtaining an acrylate.

The polyfunctional (meth)acrylate may be used alone or in combination of several.

The content of the polyfunctional (meth)acrylate is preferably 0.5% by mass or more and less than 10% by mass, especially further preferably 1% by mass or more or less than 9% by mass, and especially further preferably 2% by mass or more or less than 8% by mass based on the present adhesive sheet.

Adding the polyfunctional (meth)acrylate at a content of 0.5% by mass or more enables adjusting the network of the acrylic-based polymer. Meanwhile, adjusting the content to less than 10% by mass enables reducing the bleed-out and enhancing the transparency in combination of the monofunctional (meth)acrylate.

(Content of Acrylate-Based Polymer)

The acrylic-based polymer combined with the butene-based polymer is preferably contained at a content of 5 to 100 parts by mass per 100 parts by mass of the butene-based polymer.

If the content of an acrylate-based polymer is 5 parts by mass or more, the cohesive force of the present adhesive sheet can be enhanced effectively. If the content of a (meth)acrylate-based polymer is 100 parts by mass or less, a low dielectric constant and shock absorption can be exhibited.

The acrylate-based polymer is contained at a rate of preferably 5 to 100 parts by mass, especially further preferably 8 parts by mass or more or 90 parts by mass or less, and especially further preferably 10 parts by mass or more or 80 parts by mass or less per 100 parts by mass of the butene-based polymer from such viewpoints.

(Tackifier)

The present adhesive sheet may also contain a tackifier to adjust the temperature of the maximum point of tan δ (glass transition temperature).

The content of the tackifier is preferably less than 10% by mass to prevent issues such as a decrease in the high temperature cohesive force and yellowing due to the addition of the tackifier. Adjusting the content to this range enables rendering the present adhesive sheet excellent in high temperature cohesive force. The tackifier may be an optional compound or a mixture of compounds which enhances the adhesiveness of the present adhesive sheet.

Examples of the tackifier include aliphatic hydrocarbon-based tackifiers represented by terpene-based tackifiers; aromatic hydrocarbon-based tackifier represented by phenol-based tackifiers; alicyclic hydrocarbon-based tackifier represented by rosin-based tackifiers; tackifiers comprising these hydrocarbon-based copolymers; epoxy-based tackifier; polyamide-based tackifiers; ketone-based tackifiers; and hydrogenated products thereof. Among these, aliphatic hydrocarbon-based tackifiers, aromatic hydrocarbon-based tackifiers, alicyclic hydrocarbon-based tackifiers, and tackifiers comprising these hydrocarbon-based copolymers are preferable from the viewpoint of compatibility. Aliphatic hydrocarbon-based tackifiers are particularly preferable.

These tackifiers can be used alone or in combination of two or more.

(Other Components)

The present adhesive sheet may contain a softening agent.

The softening agent enables adjusting the viscosity of the composition, for example, to improve the processability.

Examples of usable softening agents include petroleum hydrocarbon such as an aromatic type, a paraffin type, and a naphthene type; liquid rubbers or derivatives thereof; Vaseline; and petroleum asphalt. However, usable softening agents are not limited to these.

In an embodiment using a softening agent, one softening agent or a combination of a plurality of softening agents can be used.

In the present adhesive sheet, a liquid polybutene resin is treated as a butene-based polymer.

The present adhesive sheet may contain an antirust.

As the types of antirusts, triazoles and benzotriazoles are particularly preferable, and enables preventing a transparent electrode on a touch panel from corroding.

A preferable amount added is 0.01 to 5% by mass, and the amount added is further preferably 0.1 to 3% by mass based on the present adhesive sheet. Since the HSPs of the present adhesive sheet are separated from those of the antirust, the addition of 0.01% by mass also enables exhibiting an effect. Meanwhile, adjusting the amount added to 5% by mass or less enables maintaining the transparency.

The present adhesive sheet may contain a silane coupling agent.

As the type of the silane coupling agent, silane coupling agents containing a glycidyl group and silane coupling agents having a (meth)acrylic group and a vinyl group are particularly preferable. By containing these, when the adhesive sheet is formed into a laminated body, adhesion to a member sheet can improve, and the foaming phenomenon can be suppressed under a wet heat environment.

A preferable amount added is 0.01 to 3% by mass, and a further preferable amount added is 0.1 to 1% by mass based on the present adhesive sheet. Adding the silane coupling agent at even 0.01% by mass enables exhibiting an effect depending on the adherend. Meanwhile, adjusting the amount added to 3% by mass or less enables maintaining the transparency.

The present adhesive sheet may contain an acrylamide.

When acrylamide is contained, the adhesion to a member sheet can be improved in the same way as the silane coupling agent. It is preferable to switch between acrylamide and the silane coupling agent or use acrylamide and the silane coupling agent together depending on the member sheet and use.

Examples of particularly preferable acrylamide include acryloyl morpholine, dimethylacrylamide, diethylacrylamide, dimethylaminopropylacrylamide, isopropylacrylamide, and hydroxyethylacrylamide.

A preferable amount added is 0.01 to 20% by mass based on the present adhesive sheet, and 0.1 to 10% by mass is further preferable. Adding acrylamide at even 0.01% by mass enables exhibiting an effect depending on the member sheet. Meanwhile, adjusting the amount added to 20% by mass or less enables maintaining the transparency.

Besides, a polymerization initiator, a hardening accelerator, a filler, a coupling agent, an ultraviolet absorber, an ultraviolet stabilizer, an antioxidant, a stabilizer, a pigment, or a combination of some thereof may be added to the curable composition of the present adhesive sheet.

The amounts of these additives are typically preferably selected so that the additives do not have an adverse influence on the curing of the resin composition or on the physical properties of the curable composition.

[Member Sheet]

The present laminated sheet is a laminated sheet comprising a configuration formed by laminating the first member sheet and the present adhesive sheet.

The present laminated sheet is especially preferably a laminated sheet comprising a configuration formed by laminating the first member sheet, the present adhesive sheet and the second member sheet in this order. In this case, the first member sheet and the second member sheet mean sheets located on both sides of the present adhesive sheet, and the first and the second sheets are not defined individually.

Therefore, the first member sheet and the second member sheet may be the same or different.

Although the first member sheet and second member sheet also depend on the configuration of a flexible image display device and the position of the present adhesive sheet, examples of the first member sheet and second member sheet include cover lenses, polarizing plates, phase difference films, barrier films, touch sensor films, and light emitting elements.

Examples of the materials of the first member sheet and the second member sheet include polyimides, polycarbonates, acryl polymers, TAC, polyesters, and cyclic olefin polymers.

When the configuration of image display is especially considered, the first member sheet preferably has a touch input function. When the present adhesive sheet has the above-mentioned second member sheet, the second member sheet may also have a touch input function.

In addition, the tensile strength at 25° C. of the first member sheet measured according to ASTM D882 is preferably 10 MPa to 900 MPa, especially further preferably 15 MPa or more or 800 MPa or less, and especially further preferably 20 MPa or more or 700 MPa or less.

When the present adhesive sheet has the above-mentioned second member sheet, the tensile strength at 25° C. of the second member sheet measured according to ASTM D882 is 10 MPa to 900 MPa, especially further preferably 15 MPa or more or 800 MPa or less, and especially further preferably 20 MPa or more or 700 MPa or less.

Examples of a member sheet having a high tensile strength include polyimide films and polyester films. The tensile strengths thereof are generally 900 MPa or less.

Meanwhile, examples of a member sheet having a slightly low tensile strength include TAC films and cyclic olefin polymer (COP) films. The tensile strengths thereof are 10 MPa or more. Even though a member sheet comprising such a material having a slightly low tensile strength is used for the present laminated body, trouble such as breakage can be suppressed.

[Method for Manufacturing Present Laminated Sheet]

Next, a method for manufacturing the present laminated sheet will be described. However, the following description is one example of methods for manufacture the present laminated body, and the present laminated body is not limited to a laminated body manufactured by such a manufacturing method.

In the manufacturing of the present laminated sheet, for example, a resin composition for forming the present formed body containing a butene-based polymer and an acrylic-based polymer, and, if needed, a tackifier, a polymerization initiator, other components, and the like is prepared, the resin composition is formed into a sheet shape, a butene-based polymer and an acrylic-based polymer are subjected to crosslinking, namely polymerization reaction, cured and optionally processed if needed, and the present adhesive sheet may be manufactured thereby. However, the method is not limited to this method.

The present laminated sheet can be manufactured by sticking the present adhesive sheet to the first member sheet and/or the second member sheet. However, the method is not limited to such a manufacturing method.

When the resin composition for the present adhesive sheet is prepared, the above-mentioned raw materials may be kneaded using a kneader (such as a single screw extruder, a double screw extruder, a planetary mixer, a double shaft mixer, and a pressure kneader) in which the temperature can be adjusted.

When various raw materials are mixed, various additives such as a silane coupling agent and an antioxidant may be beforehand blended with the resin and then fed to an extruder, all the raw materials may be beforehand melt mixed and then fed, or a master batch in which only an additive agent is beforehand concentrated in the resin may be produced and fed.

The resin composition for the present adhesive sheet is preferably subjected to polymerization, namely crosslinking, as described above, to impart curability to the present adhesive sheet.

At this time, the resin composition for the present adhesive sheet may be applied to the first member sheet and/or the second member sheet and polymerized, or the resin composition for the present adhesive sheet may be polymerized and stuck.

The resin composition for the present adhesive sheet preferably contains a polymerization initiator to polymerize the resin composition for the present adhesive sheet.

The polymerization initiator is not particularly limited as long as the polymerization initiator is a polymerization initiator which can be used for polymerization reaction. For example, both polymerization initiators activated with heat and polymerization initiators activated with active energy rays can be used. Both polymerization initiators which generate radicals and cause radical reaction and polymerization initiators which generate cations and anions and cause addition reaction can be used.

A preferable polymerization initiator is a photopolymerization initiator, and the selection of a photopolymerization initiator generally depends on specific components used in the curable composition and a desired curing rate at least partially.

Examples of the photopolymerization initiator include phenylphosphine oxide and diphenylphosphine oxide; ketones; acetophenone such as acridine; benzoin; benzophenone; benzoyl compounds; anthraquinone; thioxanthone; and phosphine oxide.

Specific examples of the photopolymerization initiator include photopolymerization initiators available as the trade names Darocur (Ciba Specialty Chemicals), Irgacure (Ciba Specialty Chemicals), and Lucirin (BASF) such as ethyl-2,4,6-trimethylbenzoyldiphenyl phosphinate available as Lucirin TPO.

A photopolymerization initiator having an excitation wavelength region of 400 nm or more can also be selected and used. Specific examples of the photopolymerization initiator include α-diketones such as camphorquinone and 1-phenyl-1,2-propanedione; acylphosphine oxides such as 2,4,6-trimethylbenzoyldiphenylphosphine oxide and bis(2, 4,6-trimethylbenzoyl)-phenylphosphine oxide; α-aminoalkylphenones such as 2-benzyl-2-dimethylamino-1-(4-morpholinophenyl)-butanone-1,2-methyl-1-(4-methylthiophenyl)-2-morpholinopropane-1-one; or titanocenes such as titanocene compounds such as bis(η5-2,4-cyclopentadiene-1-yl)-bis(2,6-difluoro-3-(1H-pyrrole-1-yl)phenyl)titanium. Among these, α-diketones and acylphosphine oxides are preferable, and camphor quinone and 2,4,6-trimethylbenzoyldiphenyl phosphine oxide are more preferable from the viewpoints of good polymerization activity, being less harmful to the living body, and the like.

Meanwhile, a thermal polymerization initiator can be used for polymerization except a photopolymerization initiator.

Examples of the thermal polymerization initiator include azo compounds, quinine, nitro compounds, acyl halides, hydrazone, mercapto compounds, pyrylium compounds, imidazole, chlorotriazine, benzoin, benzoin alkyl ethers, diketones, and phenones; and organic peroxides such as dilauroyl peroxide and 1,1-di(t-hexylperoxy)-3,3,5-trimethylcyclohexane available as PERHEXA TMH from NOF CORPORATION.

The polymerization initiator is often used at a concentration of around 0.01 to around 10% by mass or around 0.01 to around 5% by mass based on the total mass of the curable composition. A mixture of polymerization initiators may be used.

As a method for forming the resin composition for adhesive sheets into the shape of a formed body, a known method such as wet lamination, dry lamination, cast extrusion using T-die, extrusion lamination, calendering or an inflation method, injection molding, or liquid injection curing can be adopted. When a sheet is manufactured, especially wet lamination, cast extrusion and extrusion lamination are suitable.

Although the forming temperature at the time of melt forming is optionally adjusted by the flow properties, the film formability, or the like, the forming temperature is preferably 20 to 230° C., and more preferably 20 to 160° C. from the viewpoint of the thermal stability of the resin composition for the present adhesive sheet.

In the case of melt forming, the thickness of the formed body can be optionally adjusted by the lip gap of a T-die, the take-off speed of the formed body, the clearance of a laminating roll, and the like.

When the resin composition for adhesive sheets contains a polymerization initiator, a cured product can be manufactured by irradiating heat and/or active energy rays and curing. The present adhesive sheet can be manufactured by irradiating especially a formed body into which the resin composition for the present adhesive sheet is formed with heat and/or active energy rays.

Here, examples of irradiated active energy rays include ionizing radiation such as α-rays, β-rays, γ-rays, neutron rays, and electron rays; ultraviolet rays; and visible light. Especially ultraviolet rays are suitable from the viewpoints of suppressing damage to constituent members of optical devices and controlling the reaction.

The irradiation energy, the irradiation time, the irradiation method and the like of active energy rays are not particularly limited. The polymerization initiator may be activated, and the acrylate component may be able to be polymerized.

The resin composition for the present adhesive sheet mentioned below is dissolved in a suitable solvent, various coating techniques are used, and another embodiment of the method for manufacturing the present adhesive sheet can also be implemented. However, in this embodiment, solvent recovery or the like needs to be considered with respect to manufacturing cost.

When the coating technique is used, the present adhesive sheet can also be obtained by thermal curing besides the above-mentioned curing by active energy ray irradiation.

When formation by the coating technique is selected, a cured composition is easily obtained by thermal curing besides curing by active energy rays. When a thermosetting composition is formed, a polymerization initiator having a decomposition temperature higher than the drying temperature of a solvent is selected.

In the case of coating, the thickness of the adhesive sheet can be adjusted by the coating thickness and the solid concentration of a coating liquid.

The protective film formed by laminating a release layer at least on one side of the present adhesive sheet can also be provided from the viewpoint of preventing blocking or foreign substance adhesion.

Emboss processing and the processing of various recesses and projections (a cone and a pyramid shapes, a hemisphere shape and the like) may be performed if needed. Various surface treatments such as corona treatment, plasma treatment and primer treatment may be performed on the surface to improve the adhesiveness to various member sheets.

[Image Display Device]

An image display device can be formed by incorporating the present laminated body and, for example, laminating the present laminated body to other constituent members of the image display device.

Even though a folding operation is conducted under low temperature and high temperature conditions, the delamination and the breakage of the laminated body can be prevented, and the restorability is also good, the present laminated body can therefore form a flexible image display device.

Examples of the above-mentioned other constituent members of image display devices include optical films such as polarizing films and phase difference films; liquid crystal materials; and backlight panels.

[Description of Words and Phrases, and the Like]

A "sheet" generally refers to a thin and flat product having a thickness smaller than the length and the width in the definition in JIS. A "film" generally refers to a thin and flat product having a very small thickness as compared with the length and the width, having a maximum thickness limited optionally, and usually supplied in the form of a roll (Japanese Industrial Standards JISK6900). However, the difference between a sheet and a film is not certain, and both do not need to be distinguished from the viewpoint of wording in the present invention. In the present invention, when a product is called a "film", the product includes a "sheet", and when a product is called a "sheet", the product includes a "film".

When a product is expressed as a "panel" such as an image display panel or a protective panel, the product includes a board body, a sheet, and a film.

Herein, when "X to Y" (X and Y are any numbers.) is described, the description includes the meaning of "X or more and Y or less" and the meaning of "preferably more than X" or "preferably less than Y" unless otherwise specified.

When "X or more" (X is any number.) is described, the description includes the meaning of "preferably more than X" unless otherwise specified. When "Y or less" (Y is any number.) is described, the description includes the meaning of "preferably less than Y" unless otherwise specified.

EXAMPLES

The present invention will be further described by the following Examples. However, the present invention is not limited to Examples shown below, and interpreted.

[Manufacturing of Adhesive Sheet]

In each of Examples 1 to 4 and Comparative Examples 1 to 4, the following raw materials were blended at a mass ratio shown in Table 1 to manufacture the resin composition, the resin composition was spread in the form of a sheet on a release film release-treated with silicone and having a thickness of 100 m (PET film manufactured by Mitsubishi Chemical Corporation) so that the thickness of the resin composition was 100 m.

Next, a release film release-treated with silicone and having a thickness of 75 μm (PET film manufactured by Mitsubishi Chemical Corporation) was laminated on the sheet-shaped resin composition to form a laminated body. Light was irradiated using a metal halide lamp irradiation device (USHIO, INC., UVC-0516S1, lamp UVL-8001M3-N) so that the amount of irradiation at a wavelength of 365 nm was 2000 mJ/cm$^2$ in total. An adhesive sheet laminated body in which the release films were laminated on both sides of the adhesive sheet (sample) was obtained.

<Raw Materials of Adhesive Sheet>

Details of raw materials used for manufacturing the adhesive sheet are as follows.

(Butene-Based Polymer)

Butene-based polymer having a Mn of less than 5000: 96% by mass isobutene and 4% by mass n-butene, number-average molecular weight (Mn) 1,660, mass-average molecular weight (Mw) 3,720, HSP: δD 15.1, δP 0.0, δH 0.1

IP Solvent 2835: 100% by mass isoparaffin of C16 to C24, mass-average molecular weight (Mw): 300 or less, HSP: δD 15.1, δP 0.0, δH 0.0

Tetrax 3T: polyisobutene, number-average molecular weight (Mn) 21,400, mass-molecular weight (Mw) 49,000, HSP: δD 15.1, δP 0.0, δH 0.0

OPPANOL N50: polyisobutene, number-average molecular weight (Mn) 235,400, mass-average molecular weight (Mw) 565,000, HSP: δD 15.1, δP 0.0, δH 0.0

(Acrylate-Based Polymer, Constitutional Unit)

NK Ester S1800ALC: manufactured by SHIN-NAKA-MURA CHEMICAL CO, LTD., isostearyl acrylate, HSP: δD 16.2, δP 1.7, δH 2.5

BLEMMER CA: manufactured by NOF CORPORATION, cetyl acrylate, HSP: δD 16.1, δP 2.2, δH 2.8

NK Ester A-DOD-N: manufactured by δHIN-NAKA-MURA CHEMICAL CO, LTD., 1,10-decanediol diacrylate, HSP: δD 16.3, δP 3.8, δH 4.9

IDAA: produced by OSAKA ORGANIC CHEMICAL INDUSTRY LTD., isodecyl acrylate, HSP: δD 16.0, δP 2.4, δH 3.6

(Urethane Acrylate-Based Polymer)

CN9014NS: produced by Sartomer, difunctional urethane acrylate of hydrogenated polybutadiene (Petroleum Resin)

Quintone CX495: manufactured by ZEON CORPORATION, petroleum resin (Antioxidant)

Irganox 1076: manufactured by BASF, hindered phenolic antioxidant (Photopolymerization Initiator)

Omnirad TPO-G: manufactured by BASF, acylphosphine oxide-based photopolymerization initiator

TABLE 1

|  |  |  | Example 1, 2 | Example 3 | Example 4 | Comparative Example 1 | Comparative Example 2 | Comparative Example 3 | Comparative Example 4 |
|---|---|---|---|---|---|---|---|---|---|
| Butene-based polymer having a Mn of less than 5000 | Butene-based polymer | Mass ratio | 45.7 | 47.5 |  | 45.5 |  |  | 41.2 |
| IP Solvent 2835 |  |  |  |  | 19 |  | 6 | 14.1 |  |
| Tetrax 3T |  |  |  |  |  |  | 16.5 | 16.6 |  |
| OPPANOL N50 |  |  |  |  |  |  | 32 | 32.1 |  |
| NK Ester S1800ALC | Acrylate |  | 19.8 | 17.3 |  | 19.7 | 35.5 | 15.5 | 28.6 |
| BLEMMER CA |  |  | 15.9 | 13.8 |  | 15.8 |  | 14.7 |  |
| NK Ester A-DOD-N |  |  |  | 0.7 |  | 0.8 | 9 | 6 | 0.6 |
| IDAA |  |  |  |  | 70 |  |  |  |  |
| CN9014NS | Urethane acrylate |  | 7.2 | 5.5 | 10 | 7.1 |  |  | 5.1 |
| Quintone CX495 | Petroleum resin |  | 9.9 | 13 |  | 9.8 |  |  | 23 |
| Irganox1076 | Antioxidant |  | 0.5 | 1.2 |  | 0.5 |  |  | 0.7 |
| Omnirad TPO-G | Photopolymerization initiator |  | 1 | 1 | 1 | 0.8 | 1 | 1 | 0.8 |

[Evaluation of Adhesive Sheet]

Each adhesive sheet (sample) obtained by the Examples and Comparative Examples was evaluated as follows.

<Storage Shear Modulus (G') and Loss Tangent (Tan δ)>

The storage shear modulus G' was measured using a rheometer ("MARS" manufactured by EKO INSTRUMENTS CO., LTD.). The release PET films were removed from the laminated bodies manufactured in each of the Examples and Comparative Examples, and the remaining adhesive layers were laminated into multiple layers to obtain an adhesive sheet (sample) having a thickness of around 2 mm.

The storage shear modulus (G') and the loss tangent (tan δ) were measured under the following measurement conditions using the obtained adhesive sheet (sample) as a specimen (a circular shape having a thickness of around 2 mm and a diameter of 20 mm).

The storage shear modulus at −20° C. G' (−20° C.), the storage shear modulus at 20° C. G' (20° C.), and the storage shear modulus at 80° C. G' (80° C.) were found from the obtained data. Additionally, the gradient of the storage modulus at −20° C. to 80° C. (((G' (−20° C.)−G' (80° C.))/100)) was calculated.

The loss tangent at −20° C. tan δ (−20° C.), and the loss tangent at 80° C. tan δ (80° C.) were found from the obtained data.

Additionally, the maximum point (peak) of the tan δ was found as the glass transition temperature (Tg) from the obtained data.
(Measurement Conditions)
Under the following conditions:
Adhesion jig: parallel plate having a diameter of 20 mm
Distortion: 0.1%
Frequency: 1 Hz
Measurement temperature: −70 to 160° C.
Rate of temperature increase: 3° C./minute
<Relative Dielectric Constant>
One release PET film of the obtained adhesive sheet (sample) was removed, and the adhesive sheet was stuck to a SUS board (65 mm×65 mm×1 mm in thickness). The remaining exfoliation film was removed, and an aluminum foil having a diameter of 45 mm was roll pressure welded to prepare a sample for measuring the relative dielectric constant.
The relative dielectric constant at 23° C., 50% RH and a frequency of 100 kHz was measured using the prepared specimen with an LCR meter (manufactured by Agilent Technologies, Inc., HP4284A) according to JIS K6911.
<Haze of Adhesive Sheet>
The total light transmittance and the haze were measured with glasses pasted on both sides of an adhesive sheet (sample) wherein the release PET films were removed from each of the adhesive sheet laminated bodies obtained in the Examples and Comparatives Example using a haze meter (manufactured by NIPPON DENSHOKU INDUSTRIES CO., LTD., NDH5000) according to JIS K7361-1 and JIS K7136, respectively. Table 2 shows the results.
[Manufacturing of Laminated Sheet]
Next, the release films of each of the obtained adhesive sheet laminated bodies were removed, and a first member sheet and a second member sheet were pasted together on both sides of the adhesive sheet (sample) with a hand roll to obtain a laminated sheet (sample).
At this time, in Examples 1, 3 and 4 and Comparative Examples 1 to 3, Upilex 50S (Ube Industries, Ltd., trade name, a polyimide film having a thickness of 50 μm, tensile strength at 25° C.: 455 MPa) was used as both the first member sheet and second member sheet.
In Example 2 and Comparative Example 4, ZEONOR Film ZF14-100 (Zeon Corporation, brand name, cycloolefin polymer film having a thickness of 100 μm, tensile strength at 25° C.: 59 MPa) was used as both the first member sheet and second member sheet.

[Evaluation of Laminated Sheet]
The laminated sheet (sample) obtained by each of the Examples and Comparative Examples was evaluated as follows.
(Dynamic Folding)
The obtained laminated sheet (sample) was subjected to the cycle evaluation of U-shape bending in the settings of R=3 mm and 60 rpm (1 Hz) using a durability system in a thermostatic and humidistatic device and a Tension-Free U-Shape Folding Test Machine (manufactured by YUASA SYSTEM Co., Ltd.).
The evaluation was performed on two standards of temperatures, humidities, and numbers of cycles of −20° C. and 30,000 times; and 60° C., 90% Rh and 50,000 times, respectively. The evaluation was performed on the following evaluation standard.
○ (good): The delamination, the fracture, the buckling or the flow of the bend does not occur.
X (poor): Any of the delamination, the fracture, the buckling and the flow of the bend occurs.
(Static Folding)
The obtained laminated sheet (sample) was bent using a bending tester type 1 IMC-AOFO (Imoto Machinery Co., LTD., trade name, mandrel diameter 1 mm), bent along a mandrel at a curvature radius of 0.5 mm (R=0.5), and kept under each condition for 24 hours. The restorability 1 hour after the jig was then opened was evaluated. The evaluation was performed on two standards of temperatures and humidities of 20° C.; or 60° C. and 90% Rh. The evaluation was performed on the following evaluation standard.
○ (good): The angle of the bend is restored to 90 to 180° (flat).
X (poor): A laminated sheet wherein the angle of the bend is less than 90°, or any of the delamination, the fracture, the buckling and the flow was observed.
(Restoration Speed)
The obtained laminated sheet (sample) was bent using a bending tester type 1 IMC-AOFO (Imoto Machinery Co., LTD., trade name, mandrel diameter 1 mm) and bent along a mandrel at a curvature radius of 0.5 mm (R=0.5) under the conditions of 20° C. The jig was opened 1 hour after, time required until the laminated sheet was restored to a flat state (the angle of the bend is 180°) (sec) was measured, and the restoration speed was evaluated on the following standard.
○ (good): Time required until restoration is 10 seconds or less.
X (poor): Time required until restoration is more than 10 seconds.
Table 2 shows the evaluation results of the adhesive sheet (sample) and the laminated sheet (sample).

TABLE 2

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Adhesive sheet | Relative dielectric constant | 100 kHz, 23° C. | 2.2 | 2.2 | ND | 2.2 | 2.2 | 2.2 | 2.3 | 2.2 |
|  | Haze | % | 0.44 | 0.34 | 0.28 | 0.38 | 0.45 | 0.6 | 0.41 |
|  | Tg | Tanδ peak | −20° C. | −16° C. | −28 | −20° C. | −1° C. | −20° C. | −4° C. |
|  | Modulus G' (kPa) | −20° C. | 637 | 654 | 440 | 696 | 9233 | 1396 | 14450 |
|  |  | 20° C. | 6 | 6 | 23 | 20 |  | 148 | 17 |
|  |  | 80° C. | 4 | 2.7 | 9 | 22 | 144 | 83 | 5 |
|  | Gradient (G' (−20° C.)−G' (80° C.))/100 |  | 6.3 | 6.5 | 4.3 | 6.7 | 90.1 | 13.1 | 144.5 |
|  | Tanδ | −20° C. | 1.77 | 2.01 | 1.82 | 1.73 | 0.07 | 0.68 | 0.43 |
|  |  | 80° C. | 0.09 | 0.21 | 0.3 | 0.03 | 0.26 | 0.3 | 0.19 |
| Member sheet 1 | Tensile strength (MPa) |  | 455 | 59 | 455 | 455 | 455 | 455 | 455 | 59 |

TABLE 2-continued

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Member sheet 2 | Tensile strength (MPa) | | 455 | 59 | 455 | 455 | 455 | 455 | 455 | 59 |
| Laminated sheet | Dynamic folding (1 Hz) | R = 3, 30k −20° C. | ○ | ○ | ○ | ○ | ○ | x Organic film fractured | ○ | x Organic film fractured |
| | | R = 3, 50k 60° C., 90% Rh | ○ | ○ | ○ | ○ | Delamination x | Delamination x | Delamination x | Delamination x |
| | Static folding (R = 0.5, 24 h) | 20° C. | ○ | ○ | ○ | ○ | ○ | x Delamination and buckling | ○ | x Delamination and buckling |
| | | 60° C., 90% Rh | ○ | ○ | ○ | ○ | Delamination x | Delamination x | Delamination x | Delamination x |
| | Restoration speed | R = 0.5 | 1 sec. | 1 sec. | 1 sec. | 1 sec. | 1 sec. | 20 sec. | 20 sec. | 3 sec. |

Since Examples 1 to 4 had storage shear moduli (G' (−20° C.)) of 1 kPa or more and less than 1000 kPa, visual trouble or the fracture of the member sheets did not occur even at −20° C. in dynamic folding. It is considered that this was because since the storage shear modulus was less than 1000 kPa, stress to the films could be reduced.

Since the G' (80° C.) was 1 kPa or more and less than 10 kPa, and the loss tangent at 80° C. (tan δ (80° C.)) was less than 0.50, delamination did not occur in dynamic folding and static folding at 60° C. and 90% Rh. It is presumed that it was because since the storage shear modulus was low in the high temperature region in which the adhesive strength easily decreased, stress between layers decreased.

Examples 1 to 4 evaluated satisfactorily had a gradient of the storage shear modulus of 10 or less calculated by (G' (−20° C.)−G' (80° C.))/100.

Further, it is found that laminated sheets wherein the G' (80° C.) is in the range of 1 kPa or more and less than 10 kPa, and the tan δ (80° C.) is less than 0.50 have a good restoration speed.

Adhesive sheets having low storage shear moduli in the high temperature region have high molecular weights between crosslinking points, and low tan δ in the high temperature region means that the adhesive sheets are crosslinked firmly and easily deforms elastically. It was found that laminated sheets using such adhesive sheets had good restorability.

The invention claimed is:

1. An adhesive sheet, comprising:
a butene-based polymer and an acrylic-based polymer; wherein
the butene-based polymer and the acrylic-based polymer are crosslinked, and
the adhesive sheet satisfies the following requirements (1) to (2):
(1) a storage shear modulus at 80° C. (G' (80° C.)) obtained by dynamic viscoelasticity measurement in shearing mode at a frequency of 1 Hz is 1 kPa or more and less than 20 kPa, and a loss tangent at 80° C. (tanδ (80° C.)) is less than 0.50,
(2) a storage shear modulus at −20° C. (G' (−20° C.)) obtained by dynamic viscoelasticity measurement in shearing mode at a frequency of 1 Hz is 1 kPa or more and less than 1000 kPa.

2. The adhesive sheet according to claim 1, wherein the adhesive sheet has a haze less than 1.0%.

3. The adhesive sheet according to claim 1, wherein the butene-based polymer comprises from 5% to 100% by mass of units derived from isobutene, and the units derived from isobutene are of formula (1):

4. The adhesive sheet according to claim 1, wherein the acrylic-based polymer comprises a difunctional urethane acrylate in a structure unit.

5. The adhesive sheet according to claim 1, wherein the storage shear modulus at 80° C. (G' (80° C.)) obtained by dynamic viscoelasticity measurement in shearing mode at a frequency of 1 Hz is 1 kPa or more and less than 10 kPa.

6. The adhesive sheet according to claim 1, wherein the loss tangent at 80° C. (tanδ (80° C.)) is less than 0.3.

7. A laminated sheet, comprising: a configuration formed by laminating a first member sheet and the adhesive sheet according to claim 1, wherein the laminated sheet satisfies the following requirements (1) to (3):
(1) the adhesive sheet has a storage shear modulus at 80° C. (G' (80° C.)) of 1 kPa or more and less than 20 kPa obtained by dynamic viscoelasticity measurement in shearing mode at a frequency of 1 Hz and a loss tangent at 80° C. (tanδ (80° C.)) of less than 0.50,
(2) the adhesive sheet has a storage shear modulus at −20° C. (G' (−20° C.)) of 1 kPa or more and less than 1000 kPa obtained by dynamic viscoelasticity measurement in shearing mode at a frequency of 1 Hz,
(3) the first member sheet has a tensile strength at 25° C. of 10 MPa to 900 MPa measured according to ASTM D882.

8. The laminated sheet according to claim 7, comprising: a configuration formed by laminating the first member sheet, the adhesive sheet and a second member sheet in this order.

9. The laminated sheet according to claim 7, wherein a haze of the adhesive sheet is less than 1.0%.

10. The laminated sheet according to claim 7, wherein the butene-based polymer comprises from 5% to 100% by mass of units derived from isobutene, and units derived from isobutene are of formula (1)

11. The laminated sheet according to claim 10, wherein the acrylic-based polymer comprises a difunctional urethane acrylate in a structure unit.

12. The laminated sheet according to claim 7, wherein the adhesive sheet has a storage shear modulus at 80° C. (G' (80° C.)) of 1 kPa or more and less than 10 kPa obtained by dynamic viscoelasticity measurement in shearing mode at a frequency of 1 Hz.

13. The laminated sheet according to claim 7, wherein the adhesive sheet has a loss tangent at 80° C. (tanδ (80° C.)) of less than 0.3.

14. The laminated sheet according to claim 7, wherein the first member sheet has a touch input function.

15. An image display device, comprising: the adhesive sheet according to claim 1.

16. An image display device, comprising: the laminated sheet according to claim 7.

17. The adhesive sheet according to claim 3, wherein the butene-based polymer further comprises a component selected from the group consisting of n-butene, isoprene, styrene and vinyl ether.

18. The adhesive sheet according to claim 3, wherein the butene-based polymer further comprises n-butene in an amount of from 0.1 to 50% by mass.

* * * * *